Sept. 27, 1938.   R. H. DRAEGER   2,131,039
FINE GRAIN TRANSLUCENT SCREEN
Filed June 9, 1936   2 Sheets-Sheet 1
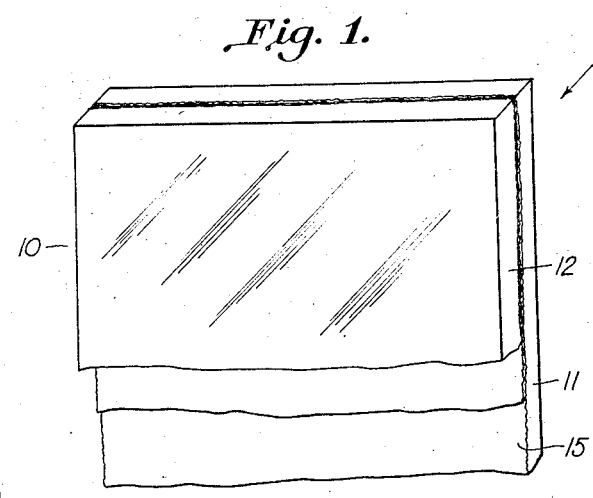
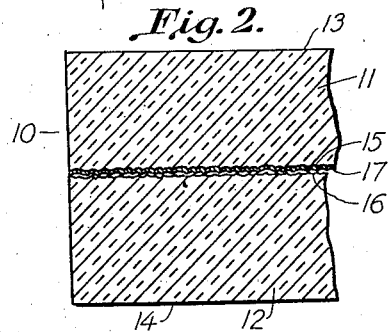
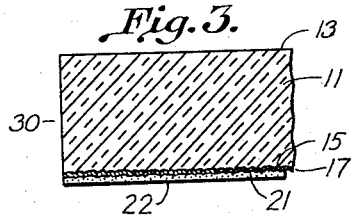
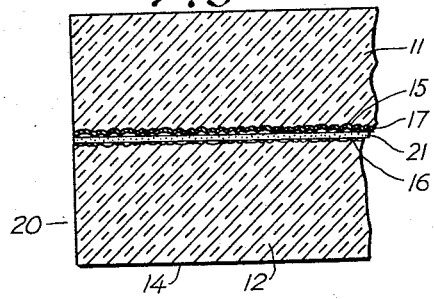
INVENTOR.
Rupert H. Draeger
BY
ATTORNEYS.

Sept. 27, 1938.   R. H. DRAEGER   2,131,039
FINE GRAIN TRANSLUCENT SCREEN
Filed June 9, 1936   2 Sheets-Sheet 2

INVENTOR.
Rupert H. Draeger.
BY
ATTORNEYS.

Patented Sept. 27, 1938

2,131,039

UNITED STATES PATENT OFFICE 2,131,039

FINE GRAIN TRANSLUCENT SCREEN

Rupert H. Draeger, United States Navy

Application June 9, 1936, Serial No. 84,298

10 Claims. (Cl. 88—24)

(Granted under the act of March 3, 1883, as amended April 30, 1928; 370 O. G. 757)

This invention relates to a projection screen and more particularly to a fine grained translucent projection screen especially intended for use with apparatus designed to project a highly detailed image of a printed page or the like.

The translucent screen in the motion picture art has been highly developed in varied degrees, but in the motion picture art there is not the necessity for the fineness and the high detail rendering power of the screen that there is in what might be called "the book reading art", where an image of a printed page is projected on a screen to the normal book page size and is studied for an appreciable length of time at normal reading distance.

In a screen of this type viewed at the distance of the greatest visual acuity, the dispersing surface must be of exceedingly fine texture if the screen is to have high detail rendering power and be of homogeneous appearance.

The use of a single finely ground surface, such as a ground glass, is not sufficient to solve the problem because the fineness of the grinding needed to give high detail rendering power causes low dispersion with decreased contrast of the image. Hence it is obvious that fine texture alone on a single surface can never solve the problem.

Also, the production of a finely ground screen is not in itself a complete solution of the problem because of the fact that there still may be a hot spot, or a too brilliantly illuminated area about the point where a direct line from the projection lens to the observer's eye intersects the screen.

This objectionable illumination is reduced by increasing the light dispersion power of the screen.

This scatters more light to the eye from points away from the direct line and scatters more light away from the eye from points near the direct line from the projection lens to the eye.

In my copending application Serial No. 49,754 on a Fine grain translucent screen there is disclosed the use of a plurality of adjacent fine ground surfaces to preserve both image detail and high dispersion in the same translucent screen. In combination with the features of that invention the use of a platinized or partially silvered glass plate is also disclosed. The platinized or partially silvered surface is on the cover glass nearest the observer. The use of a platinized glass surface in a translucent screen was taught by Brixey in U. S. Patent No. 1,269,046.

This platinized glass as disclosed by Bixey improves the appearance of the image upon the screen, but also acts as a mirror in which the observer may see annoying reflections of himself or other objects. Even when used in a darkened room the effect is still present due to the illumination of the face of the observer by light transmitted by the screen.

The translucent screen of the present invention utilizes this metallic layer without introducing this undesirable phenomenon. This is accomplished by depositing the thin layer of metal upon a finely ground surface instead of upon a polished surface as was previously done.

A further advantage of this invention over Bixey's disclosure is that it employs two adjacent ground surfaces utilizing the desirable features hereinbefore mentioned.

A still further advantage is that the presence of the thin metallic deposit upon the finely ground surface increases the light dispersing power of said surface.

The metallic coating may be placed upon the ground surface by any of the well known methods of depositing metallic films on glass or other substances such as by evaporation, sputtering, or depositing from solution.

The meaning of the expressions, "ground surface" or "finely ground surface", in this specification and appended claims is not to be restricted to surfaces prepared by mechanical grinding, but is also to include diffusing surfaces similarly roughened by any other process.

With the foregoing and other objects in view as will hereinafter become apparent this invention comprises the construction, combination, and arrangement of parts hereinafter claimed, disclosed and illustrated wherein:

Fig. 1 is a view of one form of the screen of this invention, partly broken away;

Fig. 2 is a cross sectional view on a magnified scale of the screen of Fig. 1; and Figs. 3, 4, 5, 6, and 7 are sectional views of other forms of this screen likewise on highly magnified scales.

Figure 5:
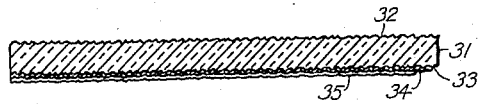

There is shown at 10 a preferred form of the screen of this invention. This screen 10 includes a pair of glass or transparent members 11 and 12 which are placed parallel to each other in substantial contact. The non-contacting surfaces 13 and 14 of the glass or transparent members 11 and 12 will preferably be smooth and highly polished. The contacting surfaces, on the other hand, are finely ground as at 15 and 16. After the surface of the glass 11 has been ground as at 15 it is subjected to any of the well known methods of depositing a metal film thereon shown at 17, so as to silver or platinize the same. Only a very thin coating of the silver or other metal is deposited on this ground surface 15. The amount preferably deposited thereon being known as a 25% silvering: i. e. it will allow 75% of the light to pass therethrough and will reflect approximately 25% of the light striking the same. As will be observed especially from the magnified showing in Fig. 2, this silver or other metal 17 is deposited on the ground surface 15 so thinly that it follows the irregularities present in the fine grained surface 15. After the finely ground surface 15 of the glass 11 has been silvered, as at 17, then the glass 12 with its ground surface 16 is placed in contact therewith, thereby completing the preferred form of the translucent screen of this invention.

The image will be preferably projected onto the screen in the direction of the arrow shown at Fig. 1 and the eye of the observer will be on the other side of the screen viewing the image through the screen.

At 30 in Fig. 3 another form of the screen is shown, but with the second glass entirely omitted. A dispersing material 21 in this form is included in a transparent paint 22 and protects the silvering 17 on the ground surface 15 of this glass 11.

In Fig. 4 the screen 20 includes the same glass 11 finely ground as at 15 and silvered as at 17 and the second glass 12 finely ground as at 16. In addition, however, a sheet of dispersing material 21 is placed between the glass plates 11 and 12 of the screen 20 thereby providing the equivalent of an extra ground surface between the glass plates 11 and 12.

Fig. 5 shows a modification of this invention in which the transparent member is in the form of a thin layer of plastic sheet material 31 ground on both sides 32 and 33. Being of plastic material, it is much less breakable than a piece of glass of corresponding thickness. A thin metallic deposit 34 is placed on the finely ground surface 33 and covered by a thin transparent protective layer 35.

Figure 6:

Fig. 6 is similar to Fig. 5 with the exception that a deposit of pigment 36 is present in the layer of plastic sheet material 31 and the grinding of the surface 32 is omitted.

Figure 7:
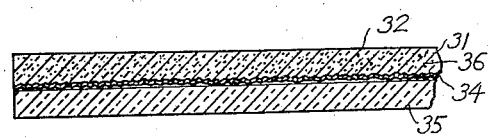

Fig. 7 is similar to Fig. 6 with the exception that a heavier protection layer 35 has been placed over the metallic deposit.

Many other modifications of this invention are, of course, possible.

The invention described herein may be manufactured and used by or for the Government of the United States of America for governmental purposes without the payment of any royalties thereon or therefor.

What I claim is:

1. A fine grain translucent screen comprising a transparent member having one face thereof finely ground and a thin, light-transmittable metallic deposit on the finely ground surface such deposit conforming to the irregularities of said face, and a transparent protective member overlying the deposit.

2. A fine grain translucent screen comprising a transparent member having one face thereof finely ground and a spicular, light-transmittable metallic deposit on the finely ground surface and conforming to the irregularities of said space, said metallic deposit being only partially light reflecting and being characterized by a marked diffusion power.

3. A fine grain translucent screen comprising a transparent member having one face thereof finely ground, a thin, light-transmittable metallic deposit on the finely ground surface, said deposit conforming to the irregularities of the ground surface, and a second transparent member having a finely ground surface thereon, the finely ground surface of the second member being placed adjacent to the finely ground metalized surface of said first member whereby the diffusion power of the screen is markedly increased.

4. A fine grain translucent screen comprising a transparent member having one face thereof finely ground, a thin, light-transmittable metallic deposit on the finely ground surface and conforming to the irregularities of the said ground face and a light dispersing material deposited on said metallic deposit.

5. A fine grain translucent screen comprising a transparent member having one face thereof finely ground, a thin, light-transmittable metallic deposit on said surface and conforming to the irregularities of the said finely ground face, a light dispersing material and a means for carrying said light dispersing material and for protecting the metallized ground surface, said means comprising a transparent coating.

6. A fine grain translucent screen comprising a thin transparent member having both faces thereof finely ground and a thin, light-transmittable metallic deposit on one of the finely ground surfaces and conforming to the irregularities of the ground surface said metallic deposit being covered by a thin transparent protective layer.

7. A fine grain translucent screen comprising a thin pigment bearing transparent member having one face thereof finely ground and a thin, light-transmittable metallic deposit on the finely ground surface and conforming to the irregularities of the ground surface, said metallic deposit being protected by a transparent protective layer.

8. A fine grain translucent screen comprising a transparent member having one face thereof finely ground and a spicular, thin, light-transmittable metallic deposit on the finely ground surface and conforming to the irregularities of the said ground face, a sheet of light dispersing material placed adjacent to said metallic deposit and held in place by a second member having its adjacent surface finely ground.

9. A reading screen comprising a light transmitting member, a finely ground surface on one face of said member, a metallic deposit on said finely ground face thin as compared to said light transmitting member, whereby the surface of the metallic deposit is substantially similar to the original surface of the finely ground face.

10. A reading screen comprising a glass member, a finely ground surface on one face of said glass member, a silver deposit on said finely ground face thin as compared to said glass member, whereby the surface of the silver deposit is substantially similar to the original surface of the finely ground face and a second glass member having a finely ground surface on one face thereof adjacent to the silvered finely ground face of said first glass member whereby to provide a translucent screen.

RUPERT H. DRAEGER.